March 30, 1937.    M. STOCKL ET AL    2,075,311
SUGAR BEET HARVESTER
Filed April 5, 1935    4 Sheets-Sheet 1
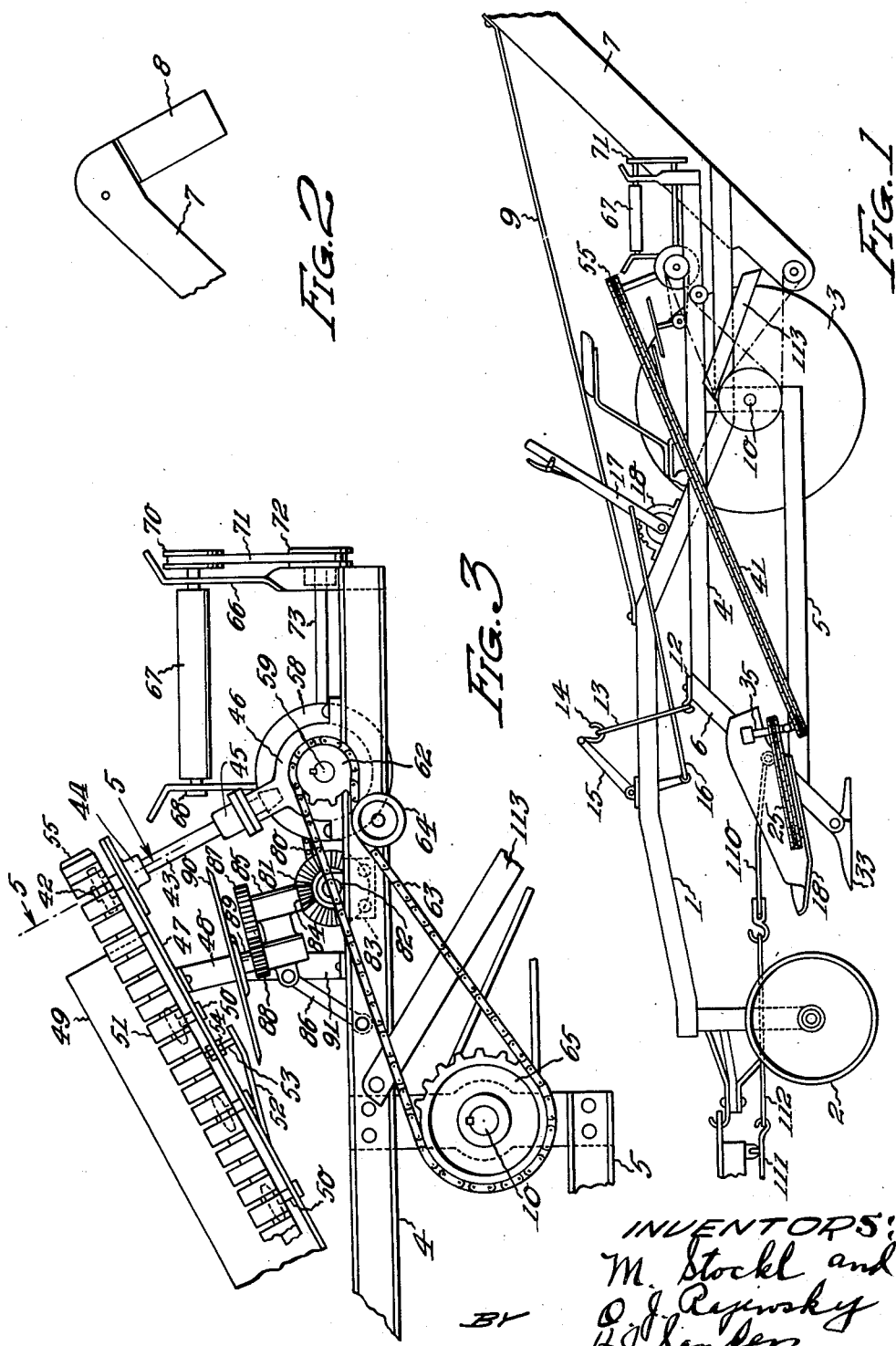
INVENTORS:
M. Stockl and
O. J. Rejinsky
BY
ATTORNEY INVENTORS:
M. Stockl and
O. J. Rajewsky
BY H. J. Sanders
ATTORNEY

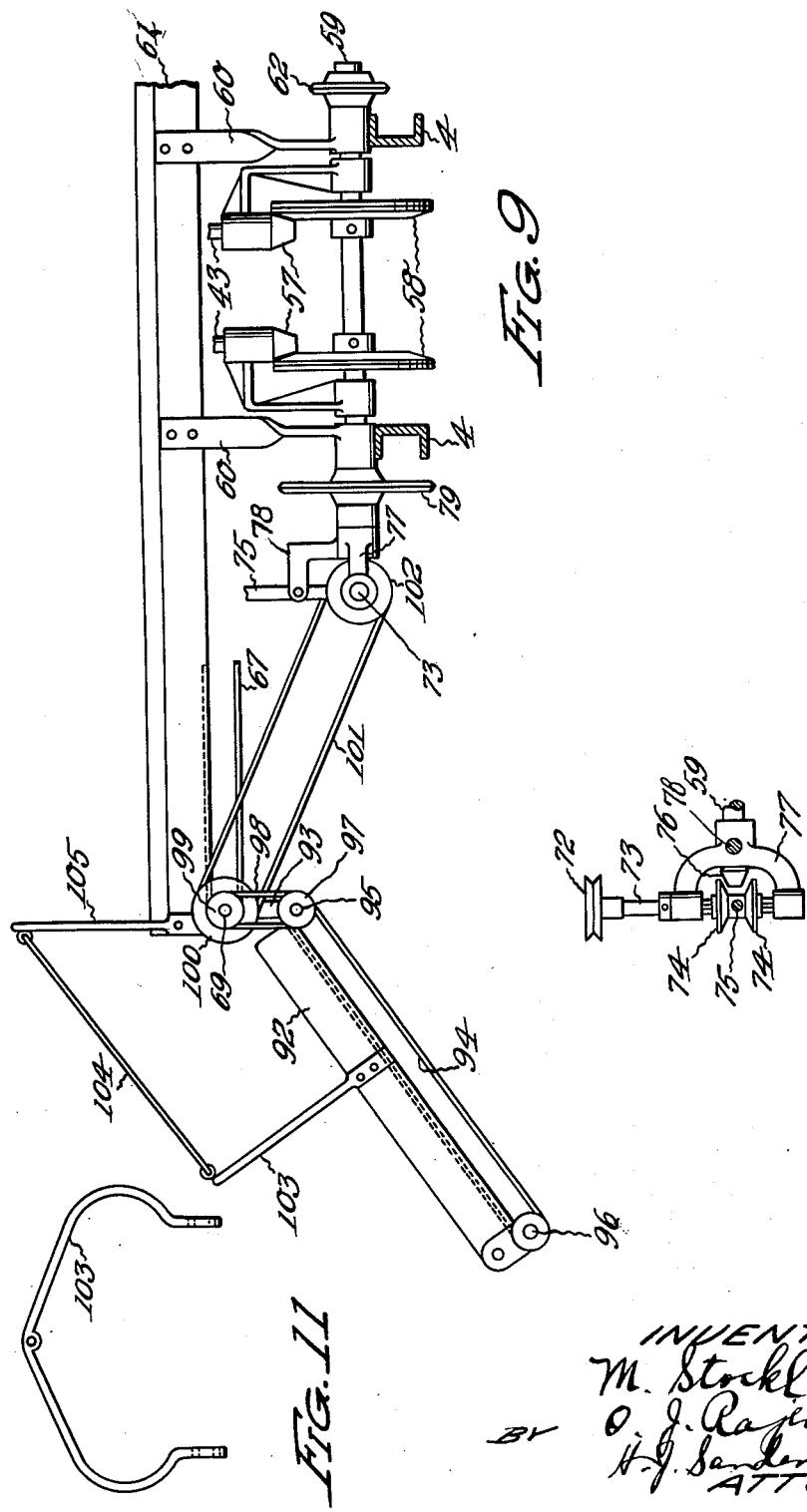

UNITED STATES PATENT OFFICE 2,075,311

SUGAR BEET HARVESTER

Michael Stockl, Delavan, and Otto J. Rajewsky, Blue Earth, Minn.

Application April 5, 1935, Serial No. 14,828

8 Claims. (Cl. 55—108)

This invention relates to improvements in sugar beet harvesters. One object is to provide a machine of this type that will dig the beets from the ground, sever the tops, convey the beets to a receptacle and pile the tops in windrows to one or the other side of the machine, the beet-top conveyer being reversible. The machine will pile the tops of three rows of beets in one windrow.

Means are provided for adjusting the beet digging element to dig at different depths and for cutting the tops according to the crop, whether long or short. A further object is to provide a sugar beet harvester that may be horse or motor propelled and wherein the machine mechanism is driven through connection to the rear wheels.

A further object is to provide a machine of this type that can be operated with a minimum of labor, that is positive and efficient in operation and one wherein the adjustments of the several parts can be readily made when necessary and substantially without the loss of time.

With the foregoing and other objects in view the invention consists in the combination and arrangement of parts to be hereinafter fully described, pointed out in the claims and illustrated in the accompanying drawings which form a part of this application for patent and in which—

Fig. 1 is a side view of the sugar beet harvester with parts eliminated.

Fig. 2 is a view of the upper end of the elevator with the chute therefor.

Fig. 3 is an enlarged fragmentary view of the rear end of the machine detailing the driving mechanism for certain conveyors and the topping knife.

Fig. 9 is a fragmentary view of the conveyor extending transversely of the rear end of the machine and of one of the chutes associated therewith.

Fig. 10 is a detail view of the driving and reversing mechanism for the conveyor shown in Fig. 9.

Fig. 11 is a view of the clevis employed.

Like reference characters denote corresponding parts throughout the several views.

Figure 4:
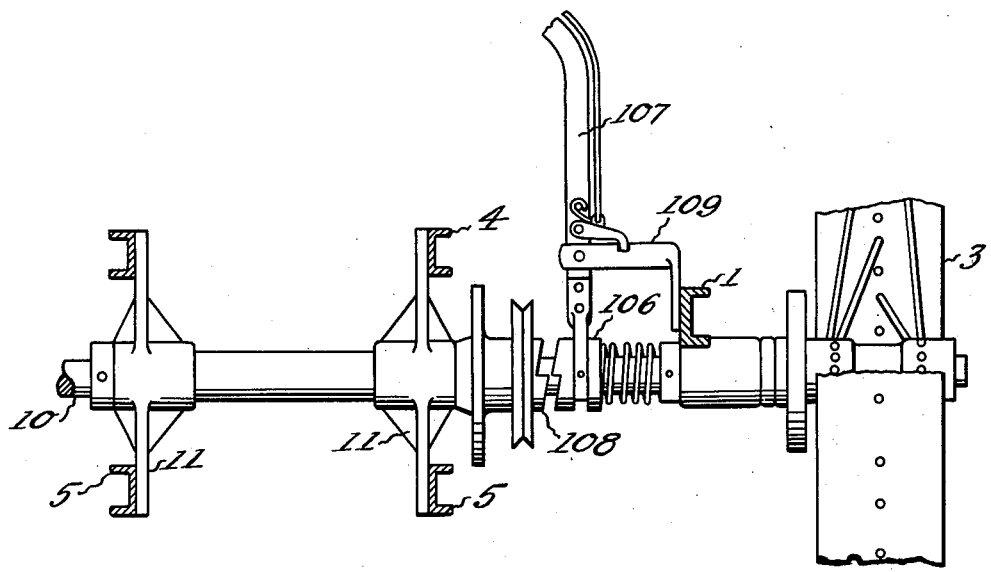
Fig. 4 is an enlarged fragmentary sectional view of the rear axle or drive shaft and connections.

The machine comprises the frame mounted to the front wheels 2 and rear wheels 3 and including the side beams 1, 4, 5, the beams 4 and 5 being connected by the obliquely disposed drop beam 6, the beams 1 at their rear ends supporting the elevator 7 provided with the chute 8 at its upper end, the elevator being connected by brace rods 9 to the beams 1. The rear wheels 3 are connected by and made fast to the rear axle 10 that is the drive shaft, the beams 4, 5, 6 form, in effect, a tilting frame that may rock independently of the beams 1 and that are mounted direct to sleeves or tilt hinges 11 loose upon the shaft 10, said beams 4, 6 being provided with a hook plate 12 connected by the link 13 to the hook 14 of the bell-crank-lever 15 fulcrumed to a frame beam 1 and connected by pitman 16 to a hand lever 17 that works over a rack 18 carried by the beam 1. By moving the lever 17 the bell-crank-lever may be rocked and the tilting frame raised or lowered with respect to the ground line.

Secured to the forward end of the tilting frame are the pick-ups or scoops 18 adjustably connected by the arms 19 to the brackets 20 formed with longitudinal slots 21 and secured to the said tilting frame-beams 6, said slots 21 receiving the upper ends of the rotary shafts 22 upon the lower ends of which the large sprocket wheels 23 are made fast, each sprocket wheel 23 being connected by sprocket chain 25 to a small sprocket wheel 24 fast upon a shaft 26, supported in a bracket secured to the frame, said sprocket wheels 24 each being provided with four fingers 27 that extend above and laterally beyond said sprocket. A bracket 28 secured to each side of the frame carries an idler 29 that engages the chain 25 to take up slack therein and to position the chain as hereinafter set forth.

Secured to the lower or forward end of each beam 6 by bolts 31 in slots 32 is the arm 30 to which the blade 33 is adjustably secured by the rosette 34, said blade being adapted to travel in the ground to loosen the earth and uproot the beets while the scoops 18 are spaced thereabove to receive the beet tops. Each shaft 22 runs in a sleeve bearing 35 supported by bracket 36, said shaft extending beyond its bearing downwardly and being connected by the universal joint 37 to the shaft 38 arranged in the bearing 39 secured to the beam 5, said shaft 38 having fast thereupon the chain wheel 40 in mesh with the driving chain 41 that at its opposite end is driven by the meshing chain wheel 42 fast upon the rotary shaft 43 journaled in bearings 44, 45, the latter being supported by the casting 46 mounted to the frame beam 4 and the former secured to the track 47 disposed beneath the chain 41 and supported by braces 48 mounted to the frame. Rising from the tracks are the sides 49 that shield the chain 41 and prevent the beet tops from falling to the ground. A shield 6a secured to the frame-beam 6 serves to prevent the beet leaves from falling over the frame.

Supported by the track 47 are a plurality of shafts 50 to which the small chain wheels 51 are secured that mesh with the chain 41 to keep the same clear of the track to prevent wear through contact therewith. Depending from the track at an angle thereto is the beet-top aligner 52, the free end thereof being spaced a suitable distance from the track and adjustably connected thereto by the bolt 53, said bolt being adjustably secured to the track by lock nuts 54. The track is formed of two or more rails spaced apart to provide clearance for the beet-tops. There are, of course, two sets of chains 41 running parallel and spaced slightly apart and together forming a conveyor, each set being driven by a chain wheel 42 fast upon a shaft 43. Each link of each chain 41 is provided with a vertically disposed resilient link 55, the free sides of the links 55 of any two opposed links of the chains 41 being disposed between those chains and spaced from each other so that a space 56 is formed between them and into this space a beet-top is received and frictionally retained while the beet is being transported from the pick-up to the knife, as hereinafter set forth.

Fast to the lower ends of the shafts 43 are the bevel pinions 57 in mesh with the bevel gears 58 fast upon a transmission shaft 59 supported in bearings 60 secured to the frame beams 4 and carrying a transverse conveyor frame 61. Fast upon one end of the shaft 59 is a chain wheel 62 connected by the chain 63, passing over the idler 64, to the large chain wheel 65 fast to the drive shaft 10. The transverse conveyor 61 is connected to the frame beams 4 by supports 66 and includes the belt or traveling element 67 fast to the terminal shafts 68, 69, the shaft 68 being provided with a pulley 70 connected by belt 71 to the shaft pulley 72 fast upon shaft 73, supported upon the frame, said shaft 73 being provided with a spool-shaped double-bevel gear 74 that slides upon a keyseat upon said shaft and is controlled by a hand lever 75 so that one or the other of the bevel gears 74 may be caused to mesh with the bevel pinion 76 at one end of the shaft 59 which end is mounted in the bracket 77 keyed to the shaft 73.

The said bracket 77 is connected by the arm 78 to the lever 75 in such manner that the lever is free to move laterally to effect movement of the double-bevel gears. Fast upon the shaft 59 is a large chain wheel 79 that is connected by the chain 80 with a small chain wheel (not shown) that is built upon the bevel gear 81 fast upon the shaft 82 supported in bearings 83, secured to the frame beam 4, said bevel gear being in mesh with the bevel pinion 84, the shaft of which is arranged in the twin bearing 85 supported by braces 86 connecting it to the frame beam and to the shaft 82, a cog wheel 87 at the upper end of the shaft of the bevel pinion 84 being in mesh with a smaller cog wheel 88, the shaft of which is in the twin bearing 85, fast upon the shaft 89 of the rotary knife 90, said shaft being supported in a bearing 91 secured to the frame beam 4.

At each end of the transverse conveyor 61 is a chute 92 pivotally connected thereto by supports 93, said chute being provided with a conveyor belt 94 mounted to the shafts 95, 96 one of which is provided with a pulley 97 connected by belt 98 to a pulley 99 upon each of the shafts 68, 69. Also fast upon the shaft 69 is a pulley 100 connected by belt 101 to a pulley 102 fast to the shaft 73. A clevis 103 spans the chute 92 and is connected by link 104 with a lever 105 operatively secured to the transverse conveyor frame. By means of the hand lever 105 the chute may be adjusted with respect to the transverse conveyor. The assembly and drive of the chute with its conveyor shown in Fig. 9 is duplicated at the opposite end of the transverse conveyor 61.

A clutch member 106 slidable upon the shaft 10 is operable by means of the hand lever 107 for engagement with the clutch member 108 whereby to transmit power from said shaft to the machine mechanism described, said lever being secured by the bracket 109 to a frame beam. At the forward end of the machine a clevis 110 engaging the frame is connected to the tug bar by link and coupling 112.

In operation, the machine is drawn over the ground by draft animals or motor, the clutch 107 keeping the clutch members 106, 108 disengaged. When the growing beets are encountered the machine is so disposed with relation to the rows of beets that pick-up scoops 18 are upon opposite sides thereof. The clutch members are now engaged. The blades 33 will loosen the earth about the beets in the ground. The scoops 18 will now engage the tops, the revolving fingers 27 will move the tops back upon the pick-up conveyor 25, the idlers 29 bulging the adjacent sides of the pair of chains toward each other so that the tops will be frictionally gripped therebetween and carried along to the point at which the sprocket wheels 23 cause the chains to separate and so to dispose the tops upon the longitudinal conveyor formed of the parallel chains 41 inserting the tops between the links 55 of said chains, said links frictionally grasping the tops and carrying them rearwardly and upwardly, the beets hanging down from the tops. As the beets pass the aligner 52 the tops pass therethrough with the beet body disposed therebelow. The divergence of the aligner from the conveyor pulls the beets down into such position with respect to the knife 90 that the tops are severed thereby a uniform distance above the beet body. The severed tops are carried by the opposed chain links 55 to the upper or rear end of the conveyor where they are dropped, due to the widening of the distance between the links 55 of the respective conveyor sections, upon the transverse conveyor 61 by which they are conveyed to one or the other side of the machine and therefrom through one of the chutes 92 they are deposited in windrows upon the ground. The transverse conveyor may be reversed by means of the hand lever 75 which will drive the shaft 73 in either of two directions.

Figure 6:
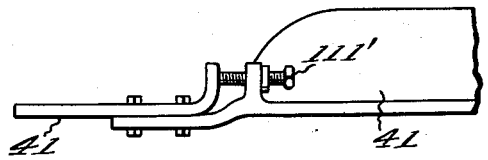
Fig. 6 is an enlarged detail view illustrating a chain tightener employed.
Figure 5:
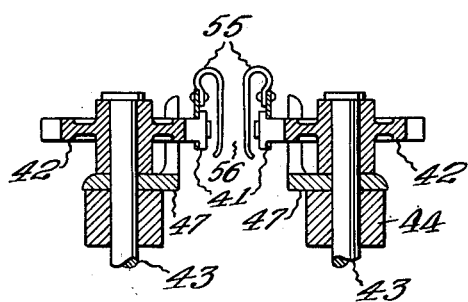
Fig. 5 is an enlarged vertical sectional view through Fig. 3 on the line 5—5.
Figure 7:
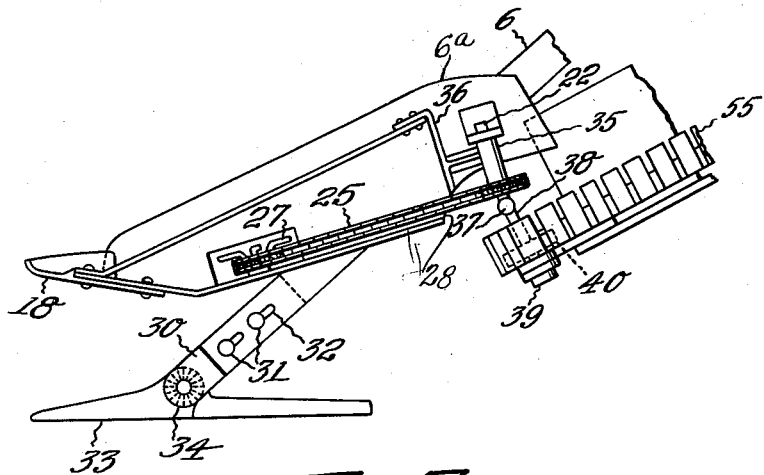
Fig. 7 is a view of the beet digging and pick-up elements and of a portion of the conveyer mechanism, taken from inside the machine.
Figure 8:
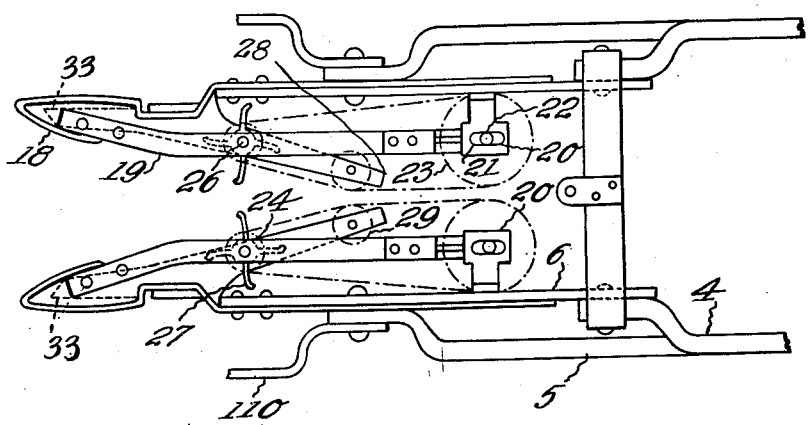
Fig. 8 is a top plan view of Fig. 7, the leaf-guard or shield being omitted to afford a better illustration.

The beets, after the tops are severed therefrom, drop from beneath the knife 90 into the chute 113, secured to the frame, and pass by gravity upon the elevator 7 and are carried to the upper end thereof to pass out through the down-spout 8 into any receptacle provided. When the machine is started to work upon the growing beets the lever 17 is moved to permit the blades 33 to dig into and break up the ground so that the beets can be readily pulled out thereafter by their tops. An adjusting screw 111' is used, as shown in Fig. 6, to take up slack in the chain 41 when necessary. The aligner 52 engaging the beet tops in its narrow slotted portion that contracts toward its free end tends to retard the movement of the beets and so pulls the beets downwardly into a uniform position with respect to the cutter.

What is claimed is:—

1. In a sugar beet harvester, a main frame, a rear supporting axle, wheels fast thereto, a tilting frame fulcrumed to said axle, blades at one end of said tilting frame, scoops at the forward end of said tilting frame above said blades, pick-up conveyors associated with said scoops, a longitudinal conveyor associated with said pick-up conveyors, a knife beneath said longitudinal conveyor, a chute disposed beneath said knife, an elevator associated with said chute, a transverse conveyor at one end of said longitudinal conveyor and below one end of same, and manually operable mechanism connecting said main frame and tilting frame for actuating the latter.

2. In a sugar beet harvester, a main frame, support wheels therefor, an axle connecting said wheels and fast thereto, a tilting frame mounted to said axle, actuating mechanism for said tilting frame connecting the same to said main frame, earth-engaging blades at one end of said tilting frame, beet-engaging and conveying means carried by said tilting frame and disposed above said blades and extending longitudinally of said frame, a rotary knife associated with said beet-conveying means for separating the tops from the beets at a predetermined point in their path of travel, a beet top conveyor associated with said beet conveying means, beet-body-conveying means associated with said knife and beet conveying means, and adjusting mechanism for said tilting frame connecting the same and said main frame.

3. In a sugar beet harvester, a main frame, a tilting frame adjustably connected thereto, a drive axle operatively supporting said frame, support wheels fast to said axle, earth-loosening blades at one end of said tilting frame, beet-top engaging and conveying means carried by said tilting frame, a rotary beet-top knife associated with said means and disposed in the path of travel of the beet tops, a transverse beet-top conveyor at one end of said tilting frame associated with said means, and beet-body conveying means associated with said knife and receiving the beet bodies severed from the tops thereby.

4. In a sugar beet harvester, a main frame, a tilting frame operatively connected thereto, earth-loosening means carried by said tilting frame, beet-engaging and conveying mechanism carried by said tilting frame and associated with said earth-loosening means, a beet-top cutter carried by said tilting frame in the path of movement of the beets, a reversible transverse beet-top conveyor associated with said beet-engaging and conveying mechanism, beet-body conveying mechanism carried by said tilting frame and associated with said beet-top cutter, and actuating mechanism for said earth-loosening means and for said conveying mechanisms operatively supporting said frames.

5. In a sugar beet harvester, beet-top engaging and conveying means, a rotary knife associated with said means, and a beet top aligner carried by said conveying means and disposed between the same and said rotary knife.

6. In a sugar beet harvester, a conveyor comprising a pair of endless chains spaced apart, and resilient links carried by said chains, the resilient links of one chain cooperating directly with those of the other chain to engage and support the beet tops.

7. In a sugar beet harvester, a conveyor comprising a pair of endless chains spaced apart, chain wheels supporting said chains, resilient links carried by said chains, the resilient links of one chain cooperating directly with those of the other chain to engage and support the beet-tops by friction, and fingers carried by said chain wheels.

8. In a sugar beet harvester, a beet-top-engaging conveyor comprising spaced cooperating sets of resilient links, a beet-top-engaging aligner disposed below and carried by said conveyor in the path of movement of the beet-tops, and a knife immediately below said aligner for engagement with the beet-tops subsequent to their engagement with said aligner.

MICHAEL STOCKL.
OTTO J. RAJEWSKY.